United States Patent [19]

Dow

[11] Patent Number: 4,837,065
[45] Date of Patent: Jun. 6, 1989

[54] COMPOSITE LAMINATE WITH ENHANCED THROUGH-THE-THICKNESS PROPERTIES

[75] Inventor: Norris F. Dow, King of Prussia, Pa.

[73] Assignee: Materials Sciences Corporation, Spring House, Pa.

[21] Appl. No.: 937,493

[22] Filed: Dec. 3, 1986

[51] Int. Cl.$^4$ .......................... B32B 3/02; B32B 33/00
[52] U.S. Cl. ........................................ 428/86; 428/92; 428/96; 428/119; 428/120; 428/257; 428/258; 428/408
[58] Field of Search ................... 428/86, 96, 119, 120, 428/408, 92, 257, 258

[56] References Cited

U.S. PATENT DOCUMENTS

| | | | |
|---|---|---|---|
| 2,349,975 | 5/1944 | Mackenzie | 428/86 |
| 3,403,484 | 10/1968 | Redey | 428/86 |
| 3,951,718 | 4/1976 | Gonzalez | 428/86 |

Primary Examiner—Marion C. McCamish
Attorney, Agent, or Firm—Ratner & Prestia

[57] ABSTRACT

A fiber reinforced composite structure having a fiber reinforcing member and a hardened matrix material. The fiber reinforcing member, or fabric, has portions which protrude substantially out of the plane of the fabric to facilitate the snugged nesting of laminated fabrics in the construction of a fiber reinforced composite structure.

8 Claims, 3 Drawing Sheets

COMPOSITE LAMINATE WITH ENHANCED THROUGH-THE-THICKNESS PROPERTIES

This invention was made with Government support under Contract NAS1-17205 awarded by National Aeronautics and Space Administration. The Government has certain rights in this invention.

FIELD OF THE INVENTION

The present invention relates to a composite structure reinforced with a generally two-dimensional (planar) fiber reinforcement member.

BACKGROUND OF THE INVENTION

Fiber reinforced composite structures are present in many products ranging from simple containers to vital structural components of jet aircraft. The benefits of using fiber reinforced composite structures in the construction of these many products results from its three main attributes: minimal weight, high strength and flexibility of design through laminated construction. Typically, fiber reinforced composite structures have been constructed using fiber reinforcing members (fabrics) having either a planar woven structure or a three dimensional woven structure.

Fabrics having a planar woven structure are often layered, forming laminates. Laminated construction permits fiber reinforced composite structures to be used in areas where a tapered or curved surface is required, since each layer of the laminate can be cut independently of the other layers.

A problem with the laminated construction is that the through-tee-thickness reinforcement provided by the fabric is at a minimum. One technique that has been tested for improving the through-the-thickness reinforcement of a composite structure has been to stitch the layers of the laminate together. However, the stitching results in damage to the fabric layers.

Fabrics having a three dimensional woven structure provide a much greater through-the-thickness reinforcement than the laminates formed by the layering of fabrics having a planar woven structure. The through-the-thickness reinforcement of these three dimensional woven fabrics is substantially reduced if the fabric is cut in order to make a taper or a curve.

Other fabrics, that have not been used in the fiber reinforced composite structure field, are similar in appearance to fabric constructions which are useful in the present invention. For example, U.S. Pat. No. 2,424,771 (Preneta) describes a fabric having upstanding ribs. The purpose of this ribbed design is to provide a longer wearing fabric with an improved appearance.

Were such ribbed fabric used as a laminate in a fiber reinforced composite structure it is doubtful that the through-the-thickness reinforcement would be improved since the ribbing does not extend significantly beyond the face of the fabric to effectuate a reinforcing action between the fabric and its colaminate.

U.S. Pat. No. 3,177,904 (Siverson) describes a fabric designed to provide a superior gripping surface for a conveyor belt. Applicant believes that the outstanding loops that provide this superior gripping surface would not enhance the through-the-thickness reinforcement of a fiber reinforced composite structure, since the round shape and the wide spacing of the loops would not effectuate a snug nesting of the lamina. The Siverson fabric does not suggest that the loops be altered in either shape or spacing. To do so may inhibit their intended purpose as a gripping surface for a conveyor belt.

SUMMARY OF THE INVENTION

A fiber reinforced composite structure having enhanced through-the-thickness reinforcement and comprised of planar woven members and a hardened matrix material which surrounds and is in contact with the planar woven members. The planar woven members contain a plurality of portions which protrude substantially out of the plane of the planar woven member. These protruding portions allow for a snug nesting of the planar woven members and yield an enhanced through-the-thickness reinforcement throughout the reinforced composite structure in a direction perpendicular to the plane of the planar woven members.

DETAILED DESCRIPTION OF THE INVENTION

Applicant's fiber reinforced composite structure comprises at least one planar woven member and a hardened matrix material which surrounds and is in contact with the planar woven member. The planar woven member or fabric which make up the reinforcement member of the present invention is woven with a plurality of portions which protrude substantially out of the plane of the fabric. The protruding portions provide enhanced through-the-thickness reinforcement in a direction perpendicular to the plane of the fabric, the reinforcement member particularly comprises a laminate of several such woven members. In the preferred embodiment, graphite yarn is used for its structural qualities which are known by those skilled in the art.

Figure 1:
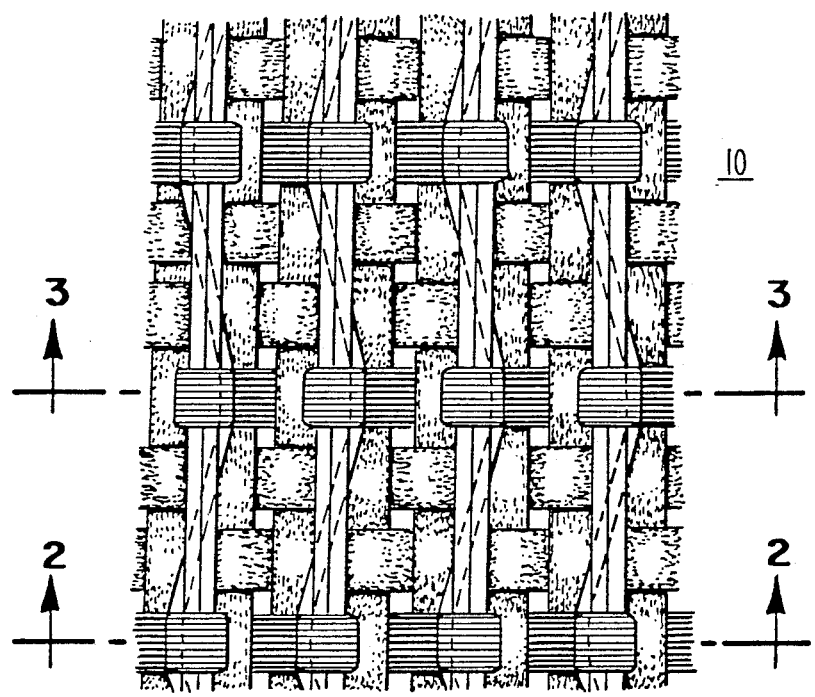
FIG. 1 shows a planar woven member having portions which protrude outward in a direction perpendicular to the plane of the weave, said member being useful in a reinforced composite structure in accordance with the present invention.

Shown in FIG. 1 is a planar woven member 10 which is the most preferred embodiment of the reinforcing member of the present invention. Fabric 10 is marked by reference planes 2—2 and 3—3.

Figure 2:
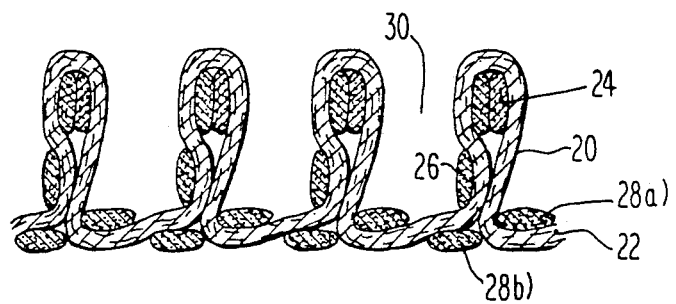
FIG. 2 is a cross-sectional view of the planar woven member shown in FIG. 1, in the plane 2—2.
Figure 3:
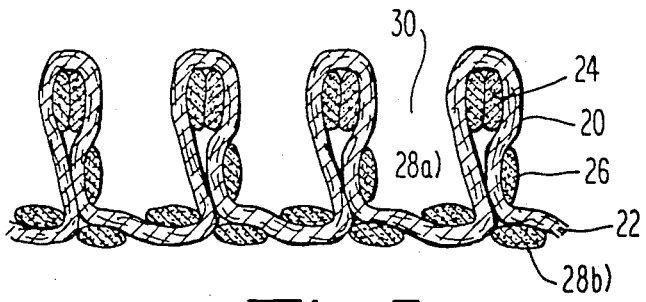
FIG. 3 shows a cross-sectional view of the planar woven member showing in FIG. 1, in the plane 3—3.

In FIGS. 2 and 3 there are shown crosssectional views of fabric 10 in reference planes 2—2 and 3—3, respectively. It can be seen that fabric 10 is comprised of weft yarns 22 and warp yarns 24, 26, 28(*a*) and 28(*b*). Warp yarns 24, 26, 28(*a*) and 28(*b*) are preferably flat yarns, i.e., untwisted yarns having an elongated cross-section and a width-to-height ratio of at least 4:1.

Adjacent warp yarns 28(a) and 28(b) are shown alternately positioned on the top and bottom (with respect to the plane of the fabric) of weft yarns 22. Warp yarns 28(a) and 28(b) are oriented so that the widthwise dimension is parallel to the plane of fabric 10. Warp yarns 24 and 26 are positioned so that the widthwise dimension of these warp yarns is perpendicular to the plane of fabric 10.

Weft yarns 22 are woven in a manner adapted to form a plurality of protruding portions 20, in which are contained warp yarns 24. A pair of warp yarns 24 are sandwiched together with an orientation as previously described. Warp yarns 24 are woven in a linear fashion along the length of planar woven member 10. The upright position of protrusions 20, which is perpendicular to and substantially out of the plane of fabric 10, is accomplished by the placement of warp yarns 26 and adjacent warp yarns 28(a) and 28(b), at the nape of protrusion 20.

Warp yarns 26 are woven in a sinusoidal pattern in a manner adapted to provide support to alternate sides of successive rows of protrusions 20. In FIG. 2 warp yarns 26 are on the left side of protrusions 20, whereas in FIG. 3, warp yarns 26 are on the right side of protrusions 20. Therefore, in one row, warp yarns 26 are on the left side of protrusions 20, whereas in both of the neighboring rows, warp yarns 26 are on the right side of protrusions 20.

Adjacent warp yarns 28(a) and 28(b) alternate from above the plane of fabric 10 to below the plane of fabric 10 in a sinusoidal pattern. Warp yarns 28(a) are positioned above the plane of the fabric for one row and then below the plane of the fabric for both of the neighboring rows. Warp yarns 28(b) are also woven in a sinusoidal pattern, 360 degrees out of phase with warp yarns 28(a). When warp yarns 28(a) are positioned above the plane of fabric 10, warp yarns 28(b) are positioned below the plane of fabric 10. When warp yarns 28(a) are positioned below the plane of fabric 10, warp yarns 28(b) are positioned above the plane of fabric 10.

The positioning of warp yarns 26 and adjacent warp yarns 28(a) and 28(b) ensures that the bases of protrusions 20 are constricted, thus maintaining the upright position of protrusions 20 substantially out of the plane of fabric 10.

Figure 4:
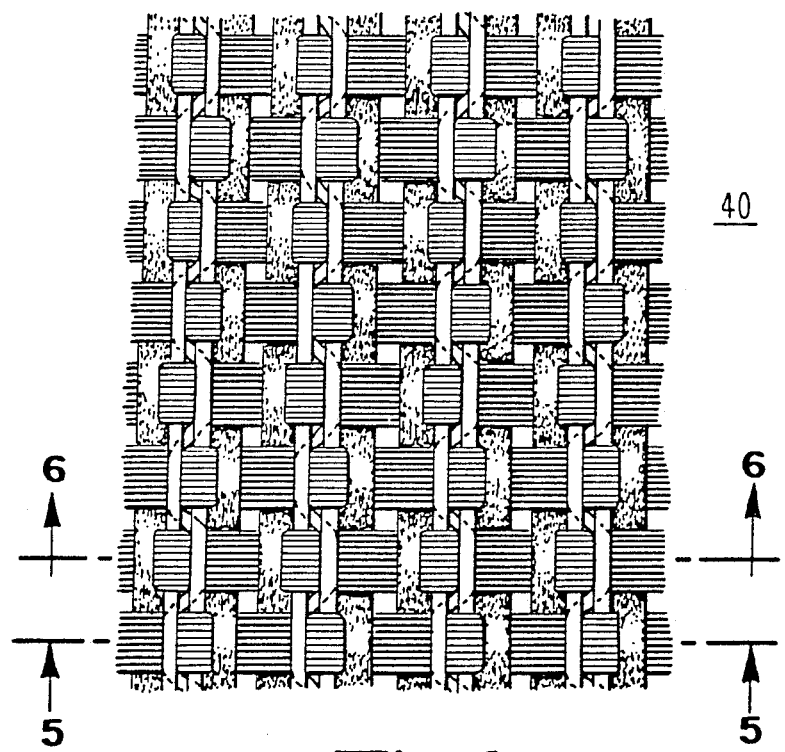
FIG. 4 shows an alternate embodiment of the planar woven member shown in FIG. 1.

In FIG. 4 there is shown a planar woven member (or fabric), 40. Fabric 40 is a preferred embodiment of the reinforcement member of the present invention. Fabric 40 is marked by reference planes 5—5 and 6—6.

Figure 5:
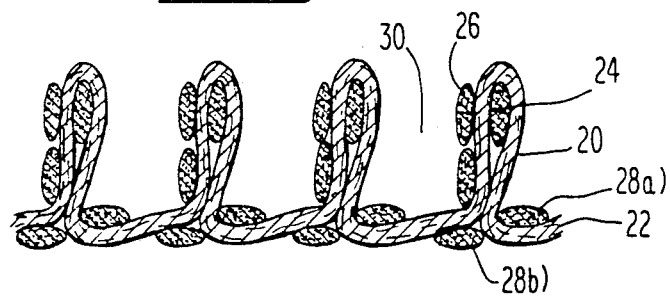
FIG. 5 shows a cross-sectional view of the planar woven member shown in FIG. 4, in the plane 5—5.
Figure 6:
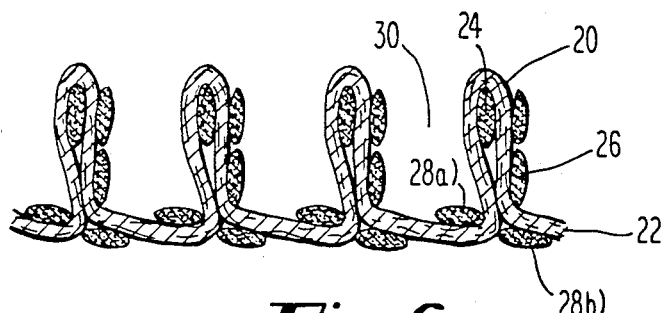
FIG. 6 shows a cross-sectional view of the planar woven member shown in FIG. 4, in the plane 6—6.

In FIGS. 5 and 6 there is shown cross-sectional views of fabric 40 in reference planes 5—5 and 6—6, respectively. It can be seen that fabric 40, like fabric 10, is comprised of weft yarns 22 and warp yarns 24, 26, 28(a) and 28(b). The orientation of warp yarns 24, 26, 28(a) and 28(b) is identical to the orientation of fabric 10 in that the widthwise dimension of warp yarns 24 and 26 is perpendicular to the plane of fabric 40 and the widthwise dimension of adjacent warp yarns 28(a) and 28(b) is parallel to the plane of fabric 40. However, the positioning of warp yarns 24 and 26 is different from that of fabric 10.

In fabric 40 there is a single warp yarn 24 within the protrusions formed by weft yarns 22, as opposed to the sandwiched pair of warp yarns 24 within the protrusions formed by weft yarns 22 in fabric 10. Further, a stacked pair of warp yarns 26 are positioned against protrusions 20 instead of the single warp yarn 26 of fabric 10.

As in fabric 10, the warp yarns of fabric alternate in a manner adapted to maintain the upright position of protrusions 20 substantially out of the plane of fabric 40.

Correspondingly useful fabrics, similar to those illustrated in FIGS. 1–6, may be devised by those skilled in the art simply by interchanging the warp and weft weave pattern.

Figure 7:
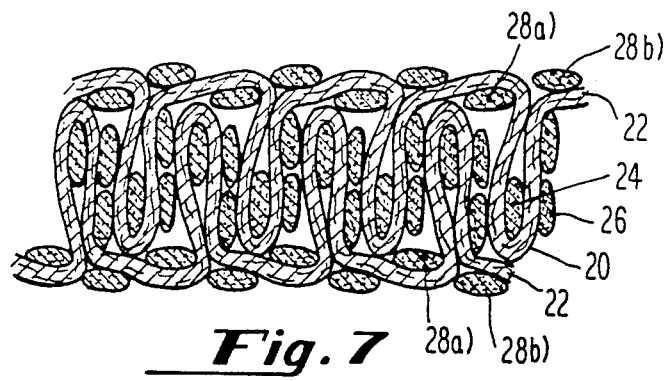
FIG. 7 shows a cross-sectional view of two planar woven members as shown in FIG. 4, nested together.

In FIG. 7 there is shown a cross-sectional view of two fabrics 40, nested together in a manner which will enhance the through-the-thickness reinforcement of the composite structure that is formed by the lamination of these fabrics. Though not shown, a hardened matrix material surrounds and is in contact with the yarns of the two fabrics 40. The nesting of the two fabrics 40 is accomplished by positioning the protrusions 20 of one fabric 40 in the spaces 30 of the other fabric 40. The preferred nesting arrangement is for the cross-section shown in FIG. 5 to be nested with the cross-section of FIG. 6. This means that warp yarns 26 will be positioned next to weft yarns 22 of the opposite fabric.

Figure 8:
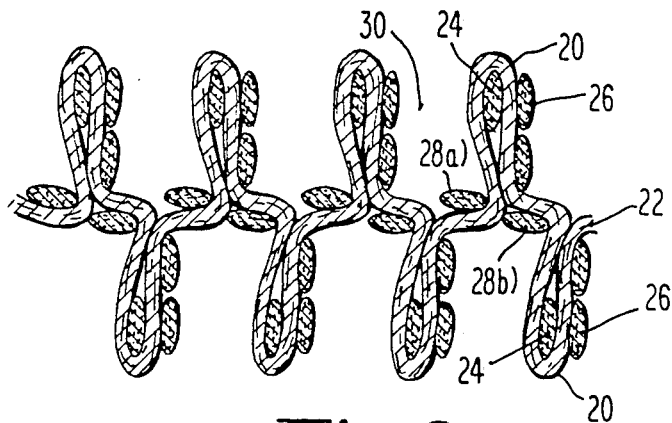
FIG. 8 shows a cross-sectional view of a planar woven member having portions which protrude outward in opposite directions from the plane of the planar woven member.
Figure 9:
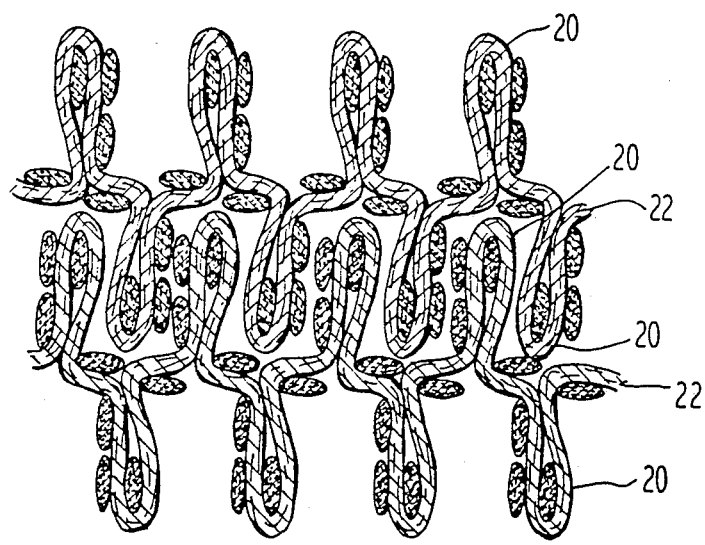
FIG. 9 shows a cross-sectional view of two planar woven members, whose cross-sections are as shown in FIG. 8, nested together.

There is shown in FIG. 8 a cross-sectional view of a fabric similar to that shown in FIG. 4, having a plurality of protrusions 20 extending in opposite directions. This fabric is used as a building block in a reinforced composite structure that contains more than two planar woven members, thus providing enhanced through-the-thickness reinforcement throughout a many-layered, reinforced composite structure, as shown in FIG. 9.

Another possibility is to rest the outer protrusions 20 of a fabric having the cross-section shown in FIG. 8, with the protrusions of a fabric 40 which, as described earlier, has protruding portions 20 on only one face. By doing so, a smooth or finished outer surface would result.

While this invention has been described with reference to specific embodiments thereof, it is not limited thereto. Instead, the claims which follow are intended to be construed to encompass not only the forms and embodiments of the invention shown and described, but also such other forms and embodiments and such variants and modifications thereof as may be devised by those skilled in the art without departing from the true spirit and scope of the present invention as may be ascertained from the foregoing description and accompanying drawings.

I claim:

1. A woven fabric having uniformly spaced loops of yarn protruding out of the plane of the fabric, each said loop formed from at least one weft yarn and two sets of warp yarns; the two sets of warp yarns comprising a substantially in-plane set and a substantially out-of-plane set;

said loops protruding out of the plane of the fabric to the extent of at least two out-of-plane warp yarn diameters;

successive loops in the same row spaced from each other by at least two in-plane warp yarn diameters;

at least one of said out-of-plane warp yarns passing through the weft yarn loop;

the remainder of said out-of-plane warp yarns woven in a sinusoidal course about the loops in neighboring rows; and the in-plane warp yarns alternating above and below the plane of the fabric in neighboring rows;

whereby the in-plane and out-of-plane warp yarns maintain the loops in a position substantially perpendicular to the plane of the fabric.

2. A woven fabric of claim 1 in which the loops protrude from both sides of the fabric.

3. A fiber-reinforced composite comprising at least one woven fabric of claim 2 and a suitable matrix material.

4. A composite of claim 3 in which a plurality of said woven fabrics are nested with one another.

5. A woven fabric of claim 1 in which the yarns are untwisted, flat yarns.

6. A woven fabric of claim 5 in which the yarns are graphite fibers.

7. A fiber-reinforced composite comprising at least one woven fabric of claim 1 and a suitable matrix material.

8. A composite of claim 7 in which a plurality of said woven fabrics are nested with one another.

* * * * *